US012648028B2

(12) United States Patent　　　　　(10) Patent No.:　US 12,648,028 B2
Paras Ram et al.　　　　　　　　　　(45) Date of Patent:　　　Jun. 2, 2026

(54) RESETTING A PRIMARY COMMUNICATIONS CHANNEL OF A DRONE BASED ON A NEW CONNECTION PARAMETER RECEIVED OVER A SECONDARY COMMUNICATIONS CHANNEL

(71) Applicant: MOTOROLA SOLUTIONS, INC., Chicago, IL (US)

(72) Inventors: Anoop Sehgal Paras Ram, Ipoh (MY); Marek Stochel, Gaj (PL); Syed Isa Syed Idrus, Bayan Lepas (MY); Krzysztof Momot, Zakliczyn (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 231 days.

(21) Appl. No.: 18/349,191

(22) Filed: Jul. 10, 2023

(65) Prior Publication Data

US 2025/0024522 A1　　Jan. 16, 2025

(51) Int. Cl.
　　*H04W 76/10*　　　(2018.01)
　　*H04W 12/122*　　(2021.01)
　　*H04W 76/30*　　　(2018.01)
(52) U.S. Cl.
　　CPC ......... *H04W 76/10* (2018.02); *H04W 12/122* (2021.01); *H04W 76/30* (2018.02)
(58) Field of Classification Search
　　CPC ... H04W 76/10; H04W 76/30; H04W 12/122; H04W 12/009; H04W 12/63121; H04W 84/06
　　See application file for complete search history.

(56) References Cited

U.S. PATENT DOCUMENTS

| 9,674,744 | B2 | 6/2017 | Xue et al. | |
| 10,007,265 | B1 | 6/2018 | Larsen | |
| 10,312,994 | B2 * | 6/2019 | Priest ..................... | H04W 4/40 |

(Continued)

FOREIGN PATENT DOCUMENTS

| CN | 107531326 | B | * | 4/2019 | ............. | H04L 67/12 |
| CN | 109714830 | A | * | 5/2019 | ............... | G08G 5/26 |

(Continued)

OTHER PUBLICATIONS

Restituyo et al., "Vulnerabilities and Attacks Analysis for Military and Commercial IoT Drones," Fordham Center for Cybersecurity Fordham University New York, NY 10023, USA, 978-1-5386-7693-6/18/$31.00 @2018 IEEE. (Year: 2018).*

(Continued)

*Primary Examiner* — Alina A Boutah

(57)　　　　　　　　ABSTRACT

Techniques for resetting a primary communications channel of a drone based on a new connection parameter received over a secondary communications channel are provided. It is detected that a drone is suspected of being hijacked. A primary communications channel to the drone that is used for flight operations is disabled. A secondary communications channel that is less suitable for flight control operations is established. At least one new connection parameter for the primary communications channel is received over the secondary communications channel. The primary communications channel is reset based on the at least one new connection parameter.

20 Claims, 3 Drawing Sheets

(56)  References Cited

U.S. PATENT DOCUMENTS

| | | | | |
|---|---|---|---|---|
| 10,412,587 B1 * | 9/2019 | Miller | ...................... | H04K 3/00 |
| 10,497,270 B2 | 12/2019 | Taveira | | |
| 10,609,555 B2 | 3/2020 | Mllar | | |
| 11,137,753 B2 * | 10/2021 | Olson | ................... | H04L 67/125 |
| 11,140,553 B1 * | 10/2021 | Taylor | ................. | H04W 12/122 |
| 11,436,929 B2 * | 9/2022 | Priest | ...................... | H04W 4/02 |
| 2019/0230675 A1 * | 7/2019 | Papa | ...................... | H04W 40/04 |
| 2020/0042797 A1 * | 2/2020 | Lee | ......................... | G06F 18/22 |
| 2021/0076219 A1 * | 3/2021 | O'Brien | .............. | H04W 12/122 |
| 2023/0080332 A1 * | 3/2023 | Eloyan | ................ | H04W 12/122 |
| | | | | 340/540 |

FOREIGN PATENT DOCUMENTS

| | | | | | |
|---|---|---|---|---|---|
| CN | 110286692 A | * | 9/2019 | ............ | H04W 4/025 |
| CN | 112040534 A | * | 12/2020 | ............ | H04W 76/10 |
| CN | 111212384 B | * | 2/2021 | ............. | G05D 1/101 |
| CN | 113573281 A | * | 10/2021 | ......... | H04B 7/18504 |
| CN | 113630741 A | * | 11/2021 | ............ | G08C 17/02 |
| CN | 114095105 A | * | 2/2022 | ............ | H04W 24/02 |
| CN | 114553933 A | * | 5/2022 | ............ | H04L 67/025 |
| CN | 114553933 B | * | 8/2022 | ............. | H04L 67/14 |
| CN | 115589595 A | * | 1/2023 | ............ | H04W 12/63 |
| CN | 115767519 A | * | 3/2023 | | |
| CN | 116545923 A | * | 8/2023 | ............. | H04L 45/44 |
| KR | 20170079782 A | * | 7/2017 | ............. | B64D 47/00 |
| KR | 20180033612 A | * | 4/2018 | ........... | B64C 39/024 |
| KR | 20180056326 A | * | 5/2018 | ............ | H04W 84/06 |
| KR | 20190116192 A | | 10/2019 | | |
| KR | 20210037521 A | * | 4/2021 | ......... | H04W 72/541 |
| KR | 102347461 B1 | | 1/2022 | | |
| KR | 20220168375 A | * | 12/2022 | ........ | H04B 7/18506 |
| KR | 102707522 B1 | * | 9/2024 | ............. | H04L 45/74 |
| WO | WO-2020226240 A1 | * | 11/2020 | ............ | B64U 10/30 |
| WO | 2022089381 A1 | | 5/2022 | | |

OTHER PUBLICATIONS

Papaioannou et al., "Cooperative Simultaneous Tracking and Jamming for Disabling a Rogue Drone," arXiv:2302.07575v1 [cs.RO] Feb. 15, 2023. (Year: 2023).*

Sun et al., "Drone Privacy Shield: A WiFi Based Defense," 978-1-5386-3531-5/17/$31.00 c 2017 IEEE. (Year: 2017).*

N et al., "Breach Detection and Mitigation of UAVs Using Deep Neural Network," RDCAPE, 2017. (Year: 2017).*

K. Yoon, D. Park, Y. Yim, K. Kim, S. K. Yang and M. Robinson, "Security Authentication System Using Encrypted Channel on UAV Network," 2017 First IEEE International Conference on Robotic Computing (IRC), Taichung, Taiwan, 2017, pp. 393-398, doi: 10.1109/IRC.2017.56.

* cited by examiner

RESETTING A PRIMARY COMMUNICATIONS CHANNEL OF A DRONE BASED ON A NEW CONNECTION PARAMETER RECEIVED OVER A SECONDARY COMMUNICATIONS CHANNEL

BACKGROUND

Usage of unmanned aerial vehicles (e.g. drones, etc.) has become much more commonplace. Members of the public may purchase reasonably priced drones, which have very impressive capabilities. Drones may be used for racing, photography, or any number of other hobbyist type activities.

Drones are increasingly being used by public safety agencies. Many agencies have begun to establish "Drone as a First Responder" type programs using drones that are much more capable than typical hobbyist drones. When a call is received at a public safety answering point (PSAP, 911 call center, etc.) reporting an incident (e.g. vehicle crash, assault, robbery, etc.) a drone may be dispatched to gain an aerial view of the location where the incident is occurring. In many cases, the drone may be able to arrive at the incident scene before human first responders are able to arrive (e.g. stuck in traffic, no responder currently available, etc.). A drone that arrives at the incident scene may relay video back to a dispatcher/drone operator in order to obtain situational awareness. This information may be relayed to first responders who are on the way to the incident location. Having such information before arrival may lead to improved first responder safety, as the first responders would no longer be entering the incident scene blind.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
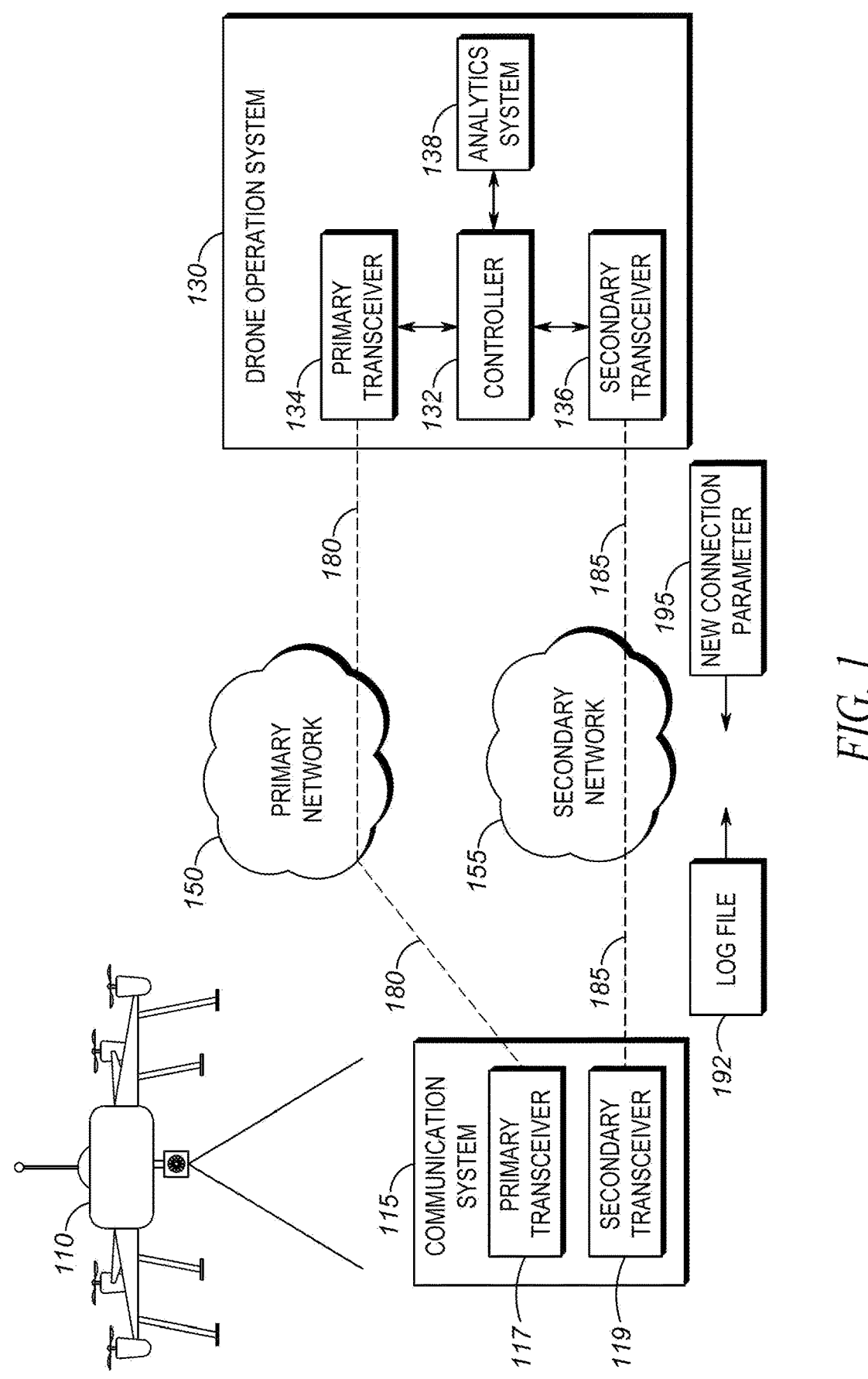
FIG. 1 is an example environment in which the techniques described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

An issue related to use of drones is that the communications link which is used to control the drone remotely by a legitimate user can be disrupted by an unauthorized person. In other words, the communications link may be hacked. In some cases, the communications link may be bombarded with excessive traffic (e.g. denial of service (DOS) attack) which would prevent legitimate control signals from being received by the drone. In other cases, the legitimate control signals may be replaced with control signals from the unauthorized user, thus allowing the unauthorized user to take over (e.g. hijack) the drone.

Given the increased use of drones as first responders in public safety situations, it has been recognized that hijacking a drone's communication channel is a technical problem that requires a technical solution, given the mission critical status of drones as first responders.

The techniques described herein first determine that a drone may have been compromised via disruption of a primary communications channel. The primary communications channel may be the channel used to communicate with the drone during normal flight operations. For example, commands to fly the drone may be sent via the primary communications channel. Real time video feedback may also be sent back to the drone operator via the primary communications channel. Although several examples of the types of information that can be sent over the primary communications channel have been described, it should be understood that the techniques described herein are not limited to those types of information. Instead, it should be understood that the primary communications channel is the channel that is used during normal operation of the drone and is able to utilize all functionality of the drone.

For purposes of this description, hijacking includes both taking control of the drone by an unauthorized person as well as disrupting communication with the drone, even if control of the drone is not taken over. There are many different techniques that may be used to make such a determination and those techniques will be discussed in further detail below.

Once it has been established that the drone may have been hijacked, the primary communications channel may be disabled. In some cases, upon disabling the primary communications channel, the drone may automatically navigate to a pre-determined location and hold in the air. In some cases, the drone may automatically land, although it should be understood that techniques described herein may be utilized regardless of if the drone lands or not.

A secondary communications channel may be established with the drone. The secondary communications channel may be less suitable for flight control operations of the drone. For example, the secondary communications channel may be bandwidth limited and can only instruct the drone to fly to a specific set of coordinates, whereas the primary communications channel may be able to control the drone in real time. As another example, the secondary communications channel may not be capable of streaming video from the drone back to the drone operator. What should be understood is that the secondary communications channel is not of a type that would allow the drone to be operated in a normal fashion. Rather, the secondary communications channel is sufficient to keep contact with the drone, but it is not suitable for sustained flight operations of the drone.

In some implementations, log data for the drone may be sent over the secondary communications channel to the drone operation system. Log data may include status information about the primary communications channel prior to it being hijacked. The log data may be useful in determining why the primary communications channel had to be disabled. For example, log data may indicate the primary communications channel was experiencing a DOS attack. Information in the log data may be analyzed to determine if the primary communications channel can be recovered.

The drone operation system may determine at least one connection parameter of the primary communications channel that may need to be modified in order to restore the primary communications channel. For example, in the case of a DOS attack, assigning a new Internet Protocol (IP) address to the primary communications channel may cause the DOS attack to be ineffective. The drone operation system may send the determined new connection parameter(s) to the drone over the secondary communications channel.

The drone may receive the new connection parameter(s) over the secondary communications channel. The primary communications channel may then be reset based on the new connection parameter(s). At such point, the primary communications channel is restored for use as the communications channel used for flight control operations. Use of the secondary communications channel may then be discontinued.

A method is provided. The method includes detecting that a drone is suspected of being hijacked. The method also includes disabling a primary communications channel to the drone, the primary communications channel used for flight control operations. The method also includes establishing a secondary communications channel, the secondary communications channel being less suitable for flight control operations. The method also includes receiving, over the secondary communications channel, at least one new connection parameter for the primary communications channel. The method also includes resetting the primary communications channel based on the at least one new connection parameter.

In one aspect, the method includes sending log data over the secondary communications channel, the log data including the status of the primary communications channel prior to disabling the primary communications channel, wherein the log data is used to identify if the primary communications channel has been compromised, the log data further used to identify the at least one new connection parameter for the primary communication channel. In one aspect, the method includes landing the drone based on the primary communications channel having been disabled.

A system is provided. The system includes a processor and a memory coupled to the processor. The memory contains a set of instructions thereon, that when executed by the processor cause the processor to detect that a drone is suspected of being hijacked. The instructions on the memory also cause the processor to disable a primary communications channel to the drone, the primary communications channel used for flight control operations. The instructions on the memory also cause the processor to establish a secondary communications channel, the secondary communications channel being less suitable for flight control operations. The instructions on the memory also cause the processor to receive, over the secondary communications channel, at least one new connection parameter for the primary communications channel. The instructions on the memory also cause the processor to reset the primary communications channel based on the at least one new connection parameter.

In one aspect, the instructions on the memory also cause the processor to send log data over the secondary communications channel, the log data including the status of the primary communications channel prior to disabling the primary communications channel, wherein the log data is used to identify if the primary communications channel has been compromised, the log data further used to identify the at least one new connection parameter for the primary communication channel. In one aspect, the instructions on the memory also cause the processor to land the drone based on the primary communications channel having been disabled.

A non-transitory computer readable medium containing a set of instructions thereon is provided. The instructions on the medium when executed by a processor cause the processor to detect that a drone is suspected of being hijacked. The instructions on the medium also cause the processor to disable a primary communications channel to the drone, the primary communications channel used for flight control operations. The instructions on the medium also cause the processor to establish a secondary communications channel, the secondary communications channel being less suitable for flight control operations. The instructions on the medium also cause the processor to receive, over the secondary communications channel, at least one new connection parameter for the primary communications channel. The instructions on the medium also cause the processor to reset the primary communications channel based on the at least one new connection parameter.

In one aspect, the instructions on the medium also cause the processor to send log data over the secondary communications channel, the log data including the status of the primary communications channel prior to disabling the primary communications channel, wherein the log data is used to identify if the primary communications channel has been compromised, the log data further used to identify the at least one new connection parameter for the primary communication channel. In one aspect, the instructions on the medium also cause the processor to land the drone based on the primary communications channel having been disabled.

In one aspect, the secondary communications channel is unsuitable for flight control operations based on at least one of insufficient bandwidth and excessive latency. In one aspect, the primary communications channel is a cellular communications channel and the secondary communications channel is a land mobile radio communications channel. In one aspect, the at least one new connection parameter is at least one of a new encryption key, a new modulation scheme, and a new credential. In one aspect, the at least one new connection parameter is at least one of a new internet protocol address and a new frequency.

Each of the above-mentioned embodiments will be discussed in more detail below, including example system and device architectures of the system in which the embodiments may be practiced, illustrations of processing blocks for achieving an improved technical method, device, and system for resetting a primary communications channel of a drone based on a new connection parameter received over a secondary communications channel.

Further advantages and features consistent with this disclosure will be set forth in the following detailed description, with reference to the figures.

FIG. 1 is an example environment 100 in which the techniques described herein may be implemented. The environment includes drone 110, drone operation system 130, primary network 150, and secondary network 155.

Drone 110 may include communications system 115. Communications system 115 includes the necessary hardware and software to allow the drone to be controlled from a remote location. The communication system typically will operate using some form of wireless communication, with radio frequency (RF) communication being the most common.

The communications system 115 may include a primary transceiver 117 that allows the drone 110 to have two-way communication with a primary network 150. The primary transceiver may allow the drone to establish a primary communications channel 180 between the drone and the drone operation system. The primary communications channel may be the channel that is used when the drone is operating in a normal (e.g. non-hijacked) mode. The primary communications channel supports the full range of available functionality for the drone.

For example, the primary communication channel 180 may allow a drone operator (not shown) to maintain complete control of the drone 110, including piloting the drone to any desired location as both pre-programmed flight patterns as well as piloting the drone in real time. The primary communications channel may also allow the drone to stream video from an on-board camera (not shown) to the drone operation system 130. The particular functionality provided over the primary communications channel is relatively unimportant. What should be understood is that the primary communications channel is configured such that it is suitable for normal flight operations.

The communications system 115 may include a secondary transceiver 119 that allows the drone 110 to have two-way communication with a secondary network 155. The secondary transceiver may allow the drone to establish a secondary communications channel 185 between the drone and the drone operation system 130. The secondary communications channel may be the channel that is used when the drone is suspected of being hijacked and may be used to attempt to restore the primary communication channel. The secondary communications channel may be less suitable for flight operations.

For example, due to limitations on the secondary communications channel 185 (e.g. bandwidth, latency, etc.) the drone 110 may not be able to provide the functionality available when using the primary communications channel 180. For example, the drone may no longer be able to stream video from the onboard camera to the drone operation system 130. As another example, the drone may not be able to be piloted in real time and may be restricted to flying in pre-programmed patterns. As yet another example, the secondary communications channel may be limited to directing the drone to land at a specified location. What should be understood is that the secondary communications channel may limit the inflight capabilities of the drone and is less suitable for flight operations than the primary communications channel.

System 100 may also include drone operations system 130, from which the drone 110 may be controlled. For example, a user (not shown) may use controller 132 to either directly fly the drone in real time or provide commands to instruct the drone to fly to a certain location. The controller may also receive information sent back from the drone, such as a real time video stream of what is captured by the onboard camera of the drone.

As shown, the controller 132 is connected to a primary transceiver 134 that allows communication with a primary network 150. As described above a primary communications channel 180 may be established between the primary transceiver and the drone 110 through the primary network. The primary communications channel is a channel that is suitable for controlling the full range of flight operations of the drone.

The controller 132 is also connected to secondary transceiver 136 that allows for communication with the drone 110 via a secondary network 155. As will be described in further detail below, when the primary communications channel 180 is disabled, the controller may communicate with the drone by establishing a secondary communications channel 185 through the secondary network. The secondary communications channel may only provide a limited set of capabilities to control the drone (e.g. no streaming of video, etc.). As such, the secondary communications channel is less suitable for flight control of the drone than the primary communications channel.

The drone operation system 130 also includes an analytics system 138 that may be used to analyze log file data 192. As will be explained in further detail below, when it is detected that the drone may have been hijacked via the primary communications channel, the drone may send a log file 192 that includes various parameters of the primary communications channel 180 and how it may have been compromised. The analytics system may then determine new connection parameters for the primary communications channel in order to restore the primary communications channel. Those new connection parameters may be sent to the drone 110 via the secondary communications channel.

The environment 100 may include a primary network 150 through which the primary communications channel 180 is created. The primary network may include characteristics (e.g. speed, bandwidth, latency, etc.) that are suitable for the full range of flight operations of the drone 110. For example, the primary network may be a network such as a 3G network, a Long Term Evolution (LTE) network, a 5G network, a Wi-Fi network, a direct mode communications system, etc. The particular form of the network is unimportant. What should be understood is that there are connection parameters (e.g. encryption keys, frequencies, IP addresses, etc.) that allow a communications channel 180 to be established between the drone and the drone operation system and that the primary communications channel is what is used during normal flight operations.

The secondary network 155 may be a network that is less suitable for flight operations, but may be more robust with respect to protecting the secondary communications channel 185 from being hacked. For example, a secondary network may be based on a Land Mobile Radio (LMR) system. For example, an LMR system based on the Project 25 (P25) protocol or the Terrestrial Radio (TETRA) protocol. Such networks are generally more secure and robust than those networks used for the primary network. This comes with the tradeoff that network characteristics (e.g. speed, bandwidth, latency, etc.) may make the secondary communications channel 185 less suitable for flight operations of the drone 110.

In operation, it may be detected that the drone 110 has been hijacked. Detection of a drone being hijacked can occur at the drone, at the drone operation system 130, or both. There are many different ways to detect that a drone has been hijacked, and some examples are presented below. Although several examples are provided, it should be understood that the techniques described herein are not dependent on the use of any particular technique. What should be understood is that it is determined that the drone has been hijacked.

One example for detecting that a drone has been hijacked is if the drone receives a suspicious flight control pattern. For example, if commands indicating conflicting controls are received in rapid succession. For example, if commands for the drone to climb in altitude are followed immediately by a command to descend are received in rapid succession, this may indicate that two different controllers (e.g. a legitimate controller and a hijacker) are attempting to simultaneously control the drone. Receiving control actions that are illegal (e.g. restricted by the Federal Aviation Administration (FAA)) may indicate that the drone is being hijacked, as such commands would not come from a legitimate source.

Yet another example of detecting that a drone has been hijacked is the drone being entering friendly locations or restricted areas. For example, drones may be restricted from flying over military bases or airports. A drone moving into such an area may indicate that it has been hijacked, as a legitimate operator would not command the drone to take such actions. Likewise, a drone being sent to surveil a friendly location may indicate the drone is hijacked, as it would normally not be expected to use drones to surveil friendly locations. For example, if a drone is commanded to the area of a police station, that drone may have been hijacked, as it may not be normal to surveil one's own location.

Yet another example, a drone may be assigned to fly a specific patrol route or have a defined flight plan. A deviation from the patrol route or flight plan may indicate that the drone has been hijacked. Likewise, deviating from a currently assigned task may indicate the drone has been hijacked. For example, in a carjacking incident, the drone may have been assigned the task of monitoring the stolen car. If the drone deviates from this task (e.g. moves in the opposite direction of the stolen car) this may indicate that the drone has been hijacked.

A very simple mechanism to determine that a drone has been hijacked may simply be failure of the primary communications channel. In such a case, even if the drone has not been hijacked, restoration of the primary communications channel would still be beneficial. The drone itself may also detect abnormal traffic on the primary control channel. For example, an excessive amount of data packets or connection requests on the primary control channel may indicate that someone is attempting to hijack the drone.

As mentioned above, the techniques described to determine that a drone has been hijacked are just some examples. The techniques described herein are not dependent on any particular mechanism to determine that the drone has been hijacked. Once it has been determined that control of the drone over the primary communications channel has been compromised, the process of restoring the primary communications channel may begin.

As an initial step in the recover process, the primary communications channel 180 between the drone 110 and the drone operation system 130 may be disabled. The reason for this is that if the primary communications channel has been compromised, the drone may not be able to determine if the commands it is receiving are coming from the drone operation system or from the drone hijacker. By disabling the primary communications channel, it can be ensured that the drone will not respond to commands over that channel.

Once the primary communications channel 180 has been disabled, the drone 110 may automatically take several actions. One of those actions may be to land in the nearest safe location or a preprogrammed location. In other implementations, the drone may remain in the current location and hover. In yet another implementation the drone may navigate to a predefined location and hover. What should be understood is that the actions that prompted concern that the drone was hijacked (e.g. flying into restricted space, etc.) are no longer a concern as the drone is now in a known location and does not receive commands, due to the primary communications channel being disabled, that would command the drone to move from that defined location.

The drone 110 may then begin to collect log data related to the primary communications channel 180. As mentioned above, either the drone itself or the drone operation system 130 may detect the drone has been hijacked and disable the primary communications channel. The process of collecting the log data is initiated by the disabling of the primary communications channel regardless of whether the disabling was initiated by the drone or the drone operation system. The content of the log files will be described in further detail below.

Once the primary communications channel 180 has been disabled, the secondary communications channel 185 may be established. In some implementations the secondary communications channel is not established until the primary communications channel 180 is disabled. In other implementations, the secondary communications channel may always be established, but may be in a dormant state. In either implementation, once the primary communications channel is disabled, the secondary communications channel may be established. As was mentioned above, the secondary communications channel may not be capable of fully supporting drone 110 flight operations due to the characteristics (e.g. speed, bandwidth, latency, etc.) of the secondary network 155.

As mentioned above, upon disabling the primary communications channel 180, the drone 110 may gather log file data that describes the status of the primary communications channel prior to that channel being disabled. Some examples of data that may be collected include the drone receiving commands over the primary communications channel that did not come from the drone operation system 130. Other examples can include excessive interference on the primary communications channel. Yet another example can include the current configuration file for the primary communications channel. Yet another example may include receipt of an excessive number of data packets (e.g. denial of service attack, etc.).

The drone 110 may then send the log file 192 to the drone operation system 130 via the second communications path 185 via the secondary communications network 155. Although the second communications network may not be suitable for fight operations due to constraints such as limited bandwidth, speed, excessive latency, etc., the secondary network may be fully capable of transmitting a log file, which does not require the same network characteristics as those required for supporting flight operations. It should be noted that in some implementations the drone initiates the transfer of the log file to the drone operation system while in other implementations, the drone operation system requests the log file from the drone. The techniques described herein are suitable for use regardless of how the transfer of the log file is initiated.

The log file 192 may be received by the drone operation system 130 and passed to an analytics system 138. The analytics system may analyze the log file to determine how the primary communications channel 180 has been compromised. Once it is determined how the primary communications channel has been compromised, it can be determined if there is corrective action that can be taken to allow the primary communications channel to be restored. As will be explained in further detail below, changing one or more connection parameters of the primary communications channel may allow the primary communications channel to be restored while disrupting the ability of the drone hijacker from regaining control of the drone 110.

Some examples of the analysis of the log file and selection of new connection parameters will now be described. It should be understood that this is not intended to be an exhaustive list of possible outcome from the analysis, but is rather intended to describe how an analysis process is used to determine connection parameters that can be altered in order to restore the primary communications channel 180.

As one example, the log file 192 may indicate that the drone 110 was receiving commands which were not sent by the controller 132, indicating that an external entity was able to send commands that appear to have come from the controller. As another example, the log file may indicate that there was excessive interference on the primary communications channel. Yet another example, the log file may indicate a change in the configuration of the primary communications channel.

The analytics system 138 may analyze the log file 192 to determine if changing one or more connection parameters would result in the primary communications channel 180 being usable again for flight operations if the primary communications channel were reset using the new connection parameters.

For example, if the log file 192 indicates commands are being received from somewhere other than the controller 132, changing the encryption keys may resolve the problem. If the log file indicates too much interference on the primary communications channel, the new connection parameters may include changing the modulation type (e.g. changing from LTE to CDMA, etc.), changing the frequency, changing the channel, enabling/disabling certain bands on a modem used for communications, etc. If the log file indicates a change in the configuration image for the primary control channel 180, the new connection parameters could include resetting the configuration image to the original image.

In the case that the log files indicate a denial of service attack (e.g. sending excessive packets to the IP address of the primary communications channel 180, the new connection parameter may be assigning a new IP address to the primary communications channel. Such a change would render an attack of the previous IP address ineffective. The new connection parameters could include triggering a restart of the primary communications channel in order to initiate new Secure Sockets Layer (SSL)/Data link connections to the server.

What should be understood is that the log file 192 may be analyzed by the analytics system 138 to determine how the primary communications channel 180 is being attacked and if changes in connection parameters 195 for the primary communications channel could allow the primary communications channel to be restored. Once the changes to the connection parameters are identified, the new connection parameters may be sent to the drone 110 over the secondary communications channel 185. The new connection parameters may be utilized by the drone to restore the primary communications channel. As has been noted above, this would be beneficial, as the secondary communications channel is less capable than the primary communications channel for supporting flight operations.

Upon receipt of the new connection parameters 195 over the secondary communications channel 185, the drone 110 may reset the primary communications channel 180 using the new connection parameters. Once the primary communications channel has been restored, the control of the drone, with full functionality, may resume over the primary communications channel.

Although the previous description only mentions a single drone 110 and drone operation system 130, it should be understood that this was for ease of description only and not for purposes of limitation. In an actual implementation, there may be any number of drones and/or drone operation systems. Furthermore, although only the communications system 115 of the drone has been described, it should understood that the drone is equipped with all other systems necessary for operations (e.g. flight control system, navigation system, camera system, etc.). Similarly, although only the communications system of the drone operation system 130 is described, the actual system would include all systems necessary to operate the drone (e.g. flight control inputs, video receiving system, etc.).

Figure 2:
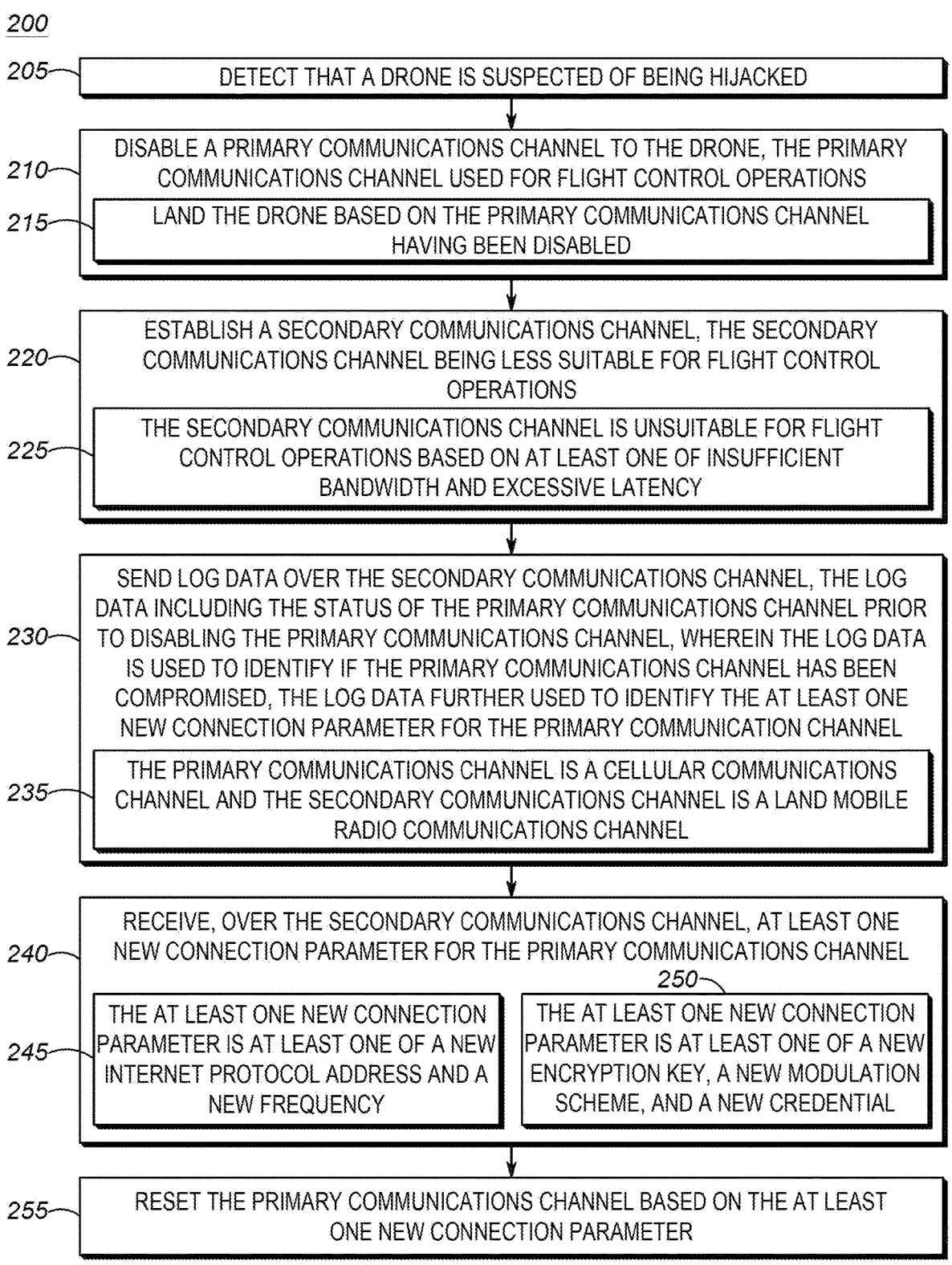
FIG. 2 is an example of a flow diagram for an implementation of the techniques described herein.

FIG. 2 is an example of a flow diagram 200 for an implementation of the techniques described herein. In block 205, it is detected that a drone is suspected of being hijacked. As described above, many techniques that may be used to detect that a drone has been hijacked. For example, if the drone fails to respond to commands, flies in restricted areas, etc. What should be understood is that the techniques described herein are not dependent of how it is determined that the drone is suspected of being hijacked, and any currently known or later developed mechanism for detecting drone hijacking would be suitable for use.

In block 210, a primary communications channel to the drone is disabled. The primary communications channel used for flight control operations. Flight operations can include commands for real time control of the drone (e.g. flying the drone real time, sending commands to the drone to fly to a specific location, etc.). Flight operations can also include sending still images and video from the drone over the primary communications channel. Real time flight operations as well as streaming video may require a communications channel with high bandwidth and low latency. For example, the communications channel may be a LTE or 5G communications channel.

In block 215, the drone may be landed based on the primary communications channel having been disabled. In other words, when the primary communications channel is lost, the drone may automatically land, either at the nearest safe location, or at a predetermined location. It should be understood that landing the drone is optional, and the techniques described herein are suitable for use even while the drone is flying. In other implementations, the drone may simply maintain its current position in the air. In yet other implementations, the drone may maneuver to a designated location and hover. What should be understood is that the drone will no longer accept flight commands via the primary communications channel and will maintain its position at a designated location.

In block 220, a secondary communications channel is established. The secondary communications channel being less suitable for flight control operations. As mentioned above, the secondary communications channel may be a LMR communications channel. The secondary communications channel may have characteristics that render the secondary communications channel less suitable for flight control operations. For example, the secondary communications channel may have insufficient bandwidth available for streaming video. As another example, the latency of the secondary communications channel may be too large to support flying the drone in real time. The secondary communications channel may only be suitable for rudimentary flight operations (e.g. instruct drone using onboard navigation to maneuver to a designated location).

In block 225, the secondary communications channel is unsuitable for fight control operations based on at least one of insufficient bandwidth and excessive latency. As explained above, the drone may stream video back to the drone operations system and this streaming may require a large amount of bandwidth. A system such as an LMR system may be designed for reliability and this may come at the price of providing lower bandwidth. Likewise, an LMR system may have excessive latency that may prohibit real time operation of the drone. The latency may affect the feedback the drone pilot obtains and may mean commands to the drone are not received in a timely manner. As flying a drone requires as close to real-time input and feedback, excessive latency would not be compatible with real time flight operations.

In block 230, log data is sent over the secondary communications channel. The log data including the status of the primary communications channel prior to disabling the primary communications channel. The log data is used to identify if the primary communications channel has been compromised. The log data is further used to identify the at least one new connection parameter for the primary communication channel. As explained above, depending on the data in the log file it may be determined that the primary communications channel has been compromised and how the channel has been compromised. Once this is determined, new connection parameters for the primary communications channel can be identified. These new connection parameters may allow the primary communications channel to be restored to an uncompromised state.

In block 235, the primary communications channel is a cellular communications channel and the secondary communications channel is a land mobile radio communications channel. Although two specific types of communications channels are described, it should be understood that the techniques described herein are not limited to those types of channels. Any suitable communications channels could be used. What should be understood is that the first communications channel is suitable for flight operations of the drone, while the second communications channel is less suitable (but not necessarily completely unsuitable) for flight operations.

In block 240, at least one new connection parameter for the primary communications channel is received over the secondary communications channel. As described above, an analytics system of the drone operation system may analyze the log data to determine how the primary communications channel can be restored. This restoration includes sending at least one new connection parameter for the drone to the drone over the secondary communications channel. It should be understood that the communications parameters do not require high bandwidth or low latency to be sent to the drone.

In block 245, the at least one new connection parameter is at least one of a new internet protocol address and a new frequency. In block 250, the at least one new connection parameter is at least one of a new encryption key, a new modulation scheme, and a new credential. It should be understood that these are simply examples of connection parameters. Any new connection parameter that would allow the primary communications channel to be recovered into a non-compromised state would also be suitable for use with the techniques described herein.

In block 255, the primary communications channel is reset based on the at least one new connection parameter. By resetting the primary communications channel with the new connection parameters, the primary communications channel may be restored in an uncompromised state. Once restored into an uncompromised state, the drone can resume being controlled over the now uncompromised primary communications channel.

Figure 3:
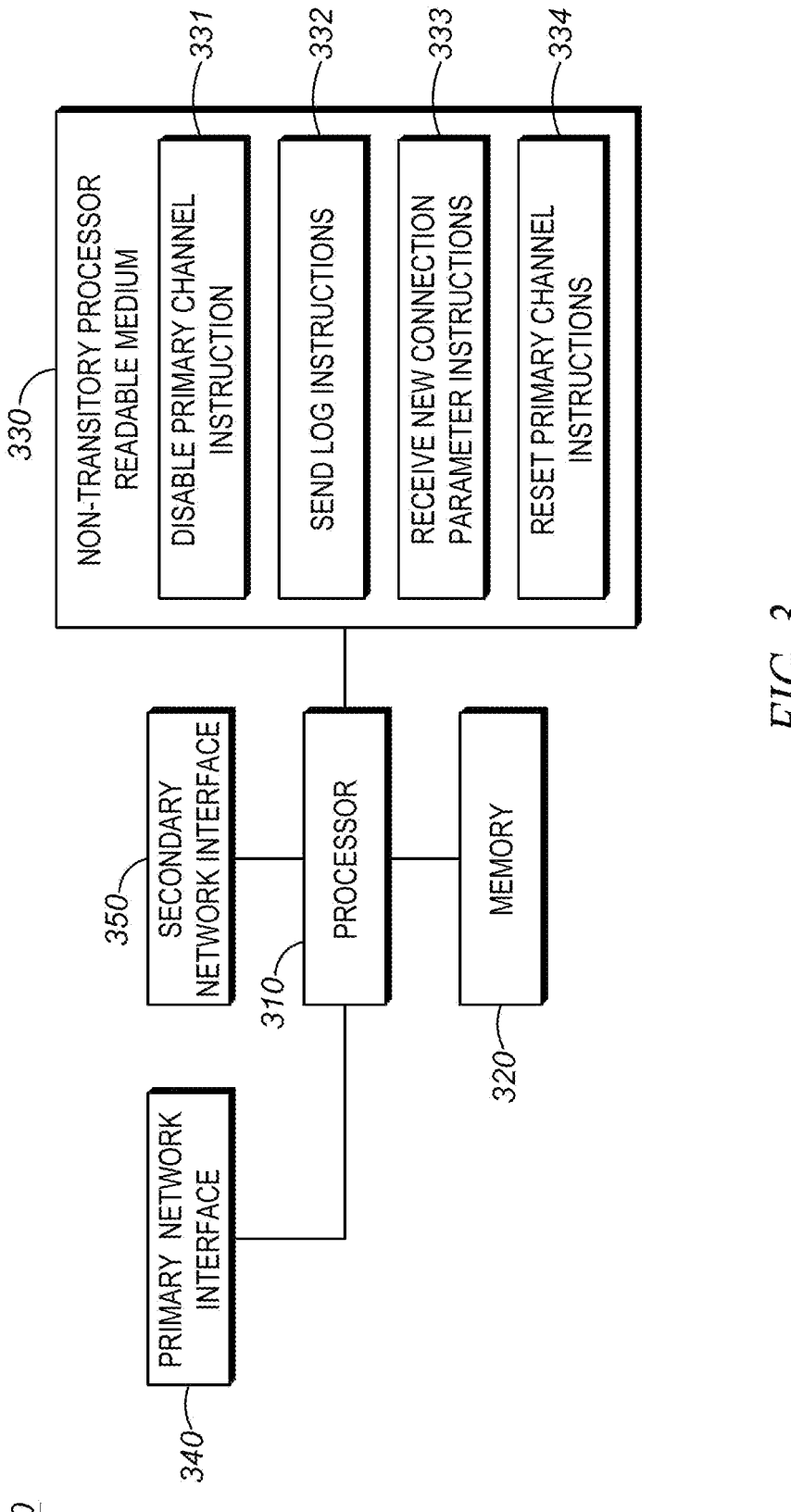
FIG. 3 is an example of a device that may implement the techniques described herein.

FIG. 3 is an example of a device 300 that may implement the techniques described herein. It should be understood that FIG. 3 represents one example implementation of a computing device that utilizes the techniques described herein. Although only a single processor is shown, it would be readily understood that a person of skill in the art would recognize that distributed implementations are also possible. For example, the various pieces of functionality described above (e.g. analyzing log files, determining new connection parameters, etc.) could be implemented on multiple devices that are communicatively coupled. FIG. 3 is not intended to imply that all the functionality described above must be implemented on a single device.

Device 300 may include processor 310, memory 320, non-transitory processor readable medium 330, primary network interface 340, and secondary network interface 350.

Processor 310 may be coupled to memory 320. Memory 320 may store a set of instructions that when executed by processor 310 cause processor 310 to implement the techniques described herein. Processor 310 may cause memory 320 to load a set of processor executable instructions from non-transitory processor readable medium 330. Non-transitory processor readable medium 330 may contain a set of instructions thereon that when executed by processor 310 cause the processor to implement the various techniques described herein.

For example, medium 330 may include disable primary channel instructions 331. The disable primary channel instructions 331 may cause the processor, at either the drone or the drone operation system, to disable the primary communications channel when it is suspected that the drone has been hijacked. For example, the processor may use the primary network interface 340 to disable the primary communications channel. The disable primary channel instructions 331 are described through the specification generally, including places such as the description of blocks 205-215.

Medium 330 may include send log instructions 332. The send log instructions 332 may cause the processor to retrieve log data from the drone related to the primary communications channel to be later analyzed. The retrieved log data may then be sent to the drone operation system via the secondary communication channel. For example, the processor may utilize the secondary network interface 350 to send the log data via the secondary communications channel. The send log instructions 332 are described generally throughout the specification, including places such as the description of blocks 220-235.

Medium 330 may include receive new connection parameter instructions 333. The receive new connection parameter instructions 333 may cause the processor to analyze the log data and determine new connection parameters that may allow the primary communications channel to be restored. For example, the processor may implement the analytics system of the drone operation system and may determine the new connection parameters. The new connection parameters may be sent to the drone using the secondary communications channel via the secondary network interface. The receive new connection parameter instructions 333 are described generally throughout the specification, including places such as the description of blocks 240-250.

Medium 330 may include reset primary channel instructions 334. The reset primary channel instructions 334 may cause the processor to reset the primary communications channel using the new connections parameters. The primary communications channel may be reset using the primary network interface 340. The reset primary channel instructions 334 are described generally throughout the specification, including places such as the description of block 255.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot disable and enable communications channels, including sending new connection parameters, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
detecting that a drone is suspected of being hijacked;
disabling a primary communications channel to the drone, the primary communications channel used for flight control operations;
establishing a secondary communications channel, the secondary communications channel being less suitable for flight control operations;
receiving, over the secondary communications channel, at least one new connection parameter for the primary communications channel; and
resetting the primary communications channel based on the at least one new connection parameter.

2. The method of claim 1 further comprising:
sending log data over the secondary communications channel, the log data including a status of the primary communications channel prior to disabling the primary communications channel, wherein the log data is used to identify if the primary communications channel has been compromised, the log data further used to identify the at least one new connection parameter for the primary communication channel.

3. The method of claim 1 wherein the secondary communications channel is unsuitable for flight control operations based on at least one of insufficient bandwidth and excessive latency.

4. The method of claim 1 wherein the primary communications channel is a cellular communications channel and the secondary communications channel is a land mobile radio communications channel.

5. The method of claim 1 wherein the at least one new connection parameter is at least one of a new encryption key, a new modulation scheme, and a new credential.

6. The method of claim 1 further comprising:
landing the drone based on the primary communications channel having been disabled.

7. The method of claim 1 wherein the at least one new connection parameter is at least one of a new internet protocol address and a new frequency.

8. A system comprising:

a processor; and a memory coupled to the processor containing a set of instructions thereon that when executed by the processor cause the processor to:

detect that a drone is suspected of being hijacked;

disable a primary communications channel to the drone, the primary communications channel used for flight control operations;

establish a secondary communications channel, the secondary communications channel being less suitable for flight control operations;

receive, over the secondary communications channel, at least one new connection parameter for the primary communications channel; and reset the primary communications channel based on the at least one new connection parameter.

9. The system of claim 8 further comprising instructions to:

send log data over the secondary communications channel, the log data including a status of the primary communications channel prior to disabling the primary communications channel, wherein the log data is used to identify if the primary communications channel has been compromised, the log data further used to identify the at least one new connection parameter for the primary communication channel.

10. The system of claim 8 wherein the secondary communications channel is unsuitable for flight control operations based on at least one of insufficient bandwidth and excessive latency.

11. The system of claim 8 wherein the primary communications channel is a cellular communications channel and the secondary communications channel is a land mobile radio communications channel.

12. The system of claim 8 wherein the at least one new connection parameter is at least one of a new encryption key, a new modulation scheme, and a new credential.

13. The system of claim 8 further comprising instructions to:

land the drone based on the primary communications channel having been disabled.

14. The system of claim 8 wherein the at least one new connection parameter is at least one of a new internet protocol address and a new frequency.

15. A non-transitory processor readable medium containing a set of instructions thereon that when executed by a processor cause the processor to:

detect that a drone is suspected of being hijacked;

disable a primary communications channel to the drone, the primary communications channel used for flight control operations;

establish a secondary communications channel, the secondary communications channel being less suitable for flight control operations;

receive, over the secondary communications channel, at least one new connection parameter for the primary communications channel; and reset the primary communications channel based on the at least one new connection parameter.

16. The medium of claim 15 further comprising instructions to:

send log data over the secondary communications channel, the log data including a status of the primary communications channel prior to disabling the primary communications channel, wherein the log data is used to identify if the primary communications channel has been compromised, the log data further used to identify the at least one new connection parameter for the primary communication channel.

17. The medium of claim 15 wherein the secondary communications channel is unsuitable for flight control operations based on at least one of insufficient bandwidth and excessive latency.

18. The medium of claim 15 wherein the primary communications channel is a cellular communications channel and the secondary communications channel is a land mobile radio communications channel.

19. The medium of claim 15 wherein the at least one new connection parameter is at least one of a new encryption key, a new modulation scheme, and a new credential.

20. The medium of claim 15 further comprising instructions to:

land the drone based on the primary communications channel having been disabled.

* * * * *